United States Patent
Moriya

(10) Patent No.: US 7,965,882 B2
(45) Date of Patent: Jun. 21, 2011

(54) IMAGE DISPLAY APPARATUS AND COMPUTER-READABLE IMAGE DISPLAY PROGRAM STORAGE MEDIUM

(75) Inventor: Yoshiyuki Moriya, Tokyo (JP)

(73) Assignee: Fujifilm Corporation, Tokyo (JP)

( * ) Notice: Subject to any disclaimer, the term of this patent is extended or adjusted under 35 U.S.C. 154(b) by 466 days.

(21) Appl. No.: 12/210,284

(22) Filed: Sep. 15, 2008

(65) Prior Publication Data

US 2009/0087059 A1 Apr. 2, 2009

(30) Foreign Application Priority Data

Sep. 28, 2007 (JP) ................................ 2007-256291

(51) Int. Cl.
- *G06K 9/00* (2006.01)
- *A61B 6/00* (2006.01)
- *A61B 1/00* (2006.01)

(52) U.S. Cl. ............... 382/131; 378/4; 378/21; 600/101

(58) Field of Classification Search .................. 382/128, 382/129, 130, 131, 132, 133, 134; 378/4, 378/21–27, 63, 90, 98.4, 98.6, 101, 140, 378/901; 600/101, 104, 117, 118, 120, 126, 600/134, 407, 410, 425, 920; 128/915, 920, 128/922

See application file for complete search history.

(56) References Cited

U.S. PATENT DOCUMENTS

| | | | | |
|---|---|---|---|---|
| 6,438,259 | B1 * | 8/2002 | Anderson et al. | 382/129 |
| 6,898,303 | B2 * | 5/2005 | Armato et al. | 382/131 |
| 7,333,648 | B2 * | 2/2008 | Edic et al. | 382/131 |
| 2002/0006216 | A1 | 1/2002 | Armato, III et al. | |

FOREIGN PATENT DOCUMENTS

| | | |
|---|---|---|
| JP | 8-294485 A | 11/1996 |
| JP | 11-306264 A | 11/1999 |
| JP | 2003-524489 A | 8/2003 |
| JP | 2006-197968 A | 8/2006 |
| JP | 2007-29248 A | 2/2007 |

OTHER PUBLICATIONS

Japanese Notification of Reasons for Refusal issued on Apr. 13, 2010 for corresponding Japanese Application No. 2007-256291.

* cited by examiner

*Primary Examiner* — Abolfazl Tabatabai

(74) *Attorney, Agent, or Firm* — Birch, Stewart, Kolasch & Birch, LLP

(57) ABSTRACT

An image display apparatus and an image display program includes image acquiring section which acquires cross-section image groups which include cross-section images on cut positions arranged in a predetermined direction of a subject, a place setting section which sets places on the cross-section images in the cross-section image groups, an image group extracting section which extracts a series of image groups which continue along the cross-section images and include the image on the places from the cross-section image groups, a cut position calculating section which calculates cut positions whose positional feature in the respective image groups is common among the image groups, on the image groups, and an image display section which arranges to display cross-section images in the cross-section image groups.

8 Claims, 11 Drawing Sheets

IMAGE DISPLAY APPARATUS AND COMPUTER-READABLE IMAGE DISPLAY PROGRAM STORAGE MEDIUM

BACKGROUND OF THE INVENTION

1. Field of the Invention

The present invention relates to an image display apparatus and a computer-readable image display program storage medium for displaying medical images obtained by photographing a subject.

2. Description of the Related Art

In medical fields, conventionally medical images obtained by photographing the insides of subject's bodies using X-ray photographic apparatuses, ultrasonic apparatuses, endoscope apparatuses and the like are widely used for diagnosis of disease conditions of subjects. When the medical images are used for diagnosis, the progress on disease of the subjects can be understood without doing external damage to the subjects. As a result, information necessary for determining therapeutic strategy can easily be obtained.

In addition to the X-ray photographic apparatuses and the endoscope apparatuses, CT (Computerized Tomography) apparatuses and MRI (Magnetic Resonance Imaging) apparatuses are increasingly installed in hospitals. The CT apparatuses photograph cross-section images of the subjects at respective cutting positions. The CT apparatuses and the MRI apparatuses can reduce pain given to the subjects at the time of test in comparison with the endoscope apparatuses whose optical probe is inserted into bodies, and can check accurate position and size of nidus three dimensionally using cross-section images. For this reason, in recent years, these apparatus are adopted in complete medical checkups or the like.

In general, medical images photographed at the time of tests are normally saved for respective subjects together with the medical charts or the like of the subjects. At the time of actual diagnosis, medical images photographed at different periods are arranged to be displayed on a monitor, and compared to read. This comparative reading easily enables checking of a change in a size of the nidus, and thus it is one of very useful methods for diagnosing a symptom and an effect of cure.

When the comparative reading is carried out by using cross-section images taken by the CT apparatuses and MRI apparatuses, for example, cross-section images on which the same nidus seems to be presented are selected from cross-section images taken in tests. Thereafter, the selected cross-section images are arranged to be displayed. However, there is a problem that a work for manually selecting desired cross section images from a number of cross-section images takes great effort and time.

In this regard, Japanese Patent Application Laid-Open No. 8-294485 discloses a technique which acquires cross-section image groups including cross-section images taken in some tests, specifies cross-section images whose cut positions are the same as one another from the cross-section image groups, relates the specified cross-section images to one another, and also relates cross-section images other than the specified cross-section images whose cut positions are the same to one another. According to the technique disclosed in Japanese Patent Application Laid-Open No. 8-294485, for example, a cross-section image presenting a nidus or the like is specified from the cross-section images taken in the first test, and a cross-section image whose cut position is considered to be the same as that on the specified cross-section image from cross-section images taken in the second test. Then, cross-section images other than these two cross-section images whose cut positions are the same are automatically selected, and are displayed on a display monitor. For this reason, the work and time required for manually selecting the cross-section images can be greatly saved.

However, it is very difficult to photograph a subject in the exactly same pose at different periods. Tilts of cross sections with respect to the subject may slightly shift due to twist of the body. In addition, for example, even if the subject is photographed by adjusting the positions of legs and head, positions in a body axis direction with respect to a chest region and an abdominal region generally shifts due to movements of internal organs according to breathing and vital activities. In such a state, when the subject is photographed with a slice width of about 5 mm and niduses imaged on one cross-section image in one cross-section image group, the niduses may be imaged separately on cross-section images in another cross-section image group, or one nidus may be imaged on different cross-section images whose cut positions are different. For this reason, even when the technique in Japanese Patent Application Laid-Open No. 8-294485 is used, there is a problem that a medical doctor needs to manually reselect cross-section images.

SUMMARY OF THE INVENTION

The present invention has been made in view of the above circumstances and provides an image display apparatus and a computer-readable storage medium storing an image display program which can accurately select and display cross-section images related to each other from cross-section images composing cross-section image groups.

According to the present invention, an image display apparatus includes:

an image acquiring section which acquires plural cross-section image groups including plural cross-section images each in each of plural cut positions arranged in a predetermined direction in a subject;

a place setting section which sets a place on image for the cross-section images for each of the plural cross-section image groups acquired by the image acquiring section;

an image group extracting section which extracts place image groups in each of which the place image presented in the place continues over among the cross-section images, each of the place image groups for each of the plural cross-section image groups;

a cut position calculating section which calculates a cut position whose positional feature in each of the place image groups is common among the plural image groups, for each of two or more of the place image groups extracted by the image group extracting section; and an image display section which arranges to display cross-section images at the cut positions each calculated by the cut position calculating section in each of the plural cross-section image groups.

"The cut positions whose positional feature in the respective image groups is common among the image groups" in the present invention indicates, for example, cut positions which pass through centers of the image groups, cut positions which pass through gravity centers in the image groups or cut positions where the image areas are maximum.

According to the image display apparatus of the present invention, not the same positions within a photographing range of a photographing apparatus and the same positions on a body axis but cut positions related to one another on the series of image groups presenting a nidus are searched for. The cross-section images on the searched cut positions are displayed on a display screen. For this reason, even when the nidus is shown on cross-section images at different cut positions in the cross-section image groups due to a shift of subject's posture, the cross-section images at the related positions of the nidus in the cross-section images are automatically displayed only by setting places considered to be a nidus on the cross-section images. For this reason, pathological changes can be easily compared.

In addition, in an image display apparatus according to the present invention, it is preferable that the cut position calculating section calculates cut positions having the feature among the cut positions of the plural cross-section images, and the image display section displays the cross-section images at the cut positions calculated by the cut position calculating section among the plural cross-section images.

When a distance (slice width) between the adjacent cut positions is sufficiently small, it is highly possible that cross-section images on the cut positions calculated by the cut position calculating section are present. For this reason, the cross-section image groups are searched for the cross-section images on the cut positions calculated by the cut position calculating section, so that the cross-section images useful for diagnosis can be quickly displayed.

In addition, in an image display apparatus according to the present invention, it is preferable that the cut position calculating section calculates new cut positions each different from the cut positions each of the plural cross-section images as the cut positions having the feature, the image display apparatus further comprises a cross-section image generating section which generates new cross-section images in the cut positions calculated by the cut position calculating section based on the plurality of cross-section images included in the cross-section image groups, and the image display section displays the cross-section images generated by the cross-section image generating section.

The new cross-section images at the cut positions calculated by the cut position calculating section are generated for the plural cross-section images composing the cross-section image groups. As a result, even when related cross-section images whose slice width is large are not present, the cross-section images on the cut positions can be displayed.

In addition, in an image display apparatus according to the present invention, it is preferable that the cut position calculating section calculates a cut position which passes through the center of gravity in each of the plurality of place image groups.

The cross-section images on the cut positions which pass through the gravity centers each of the plural image groups among plural cross-section images composing each of the cross-section image groups are arranged to be displayed. As a result, changes in sizes and shapes of the plural image groups can be surely recognized.

In addition, in an image display apparatus according to the present invention, it is preferable that the cut position calculating section calculates a cut position of the place image having a maximum area in the place image groups.

According to this preferable image display apparatus, the change in sizes of the plural image groups can be easily recognized.

In addition, in an image display apparatus according to the present invention, it is preferable that the plural cross-section image groups are shot for a same subject at different periods.

According to this preferable image display apparatus, a change and the like in a size of a subject's nidus can be easily recognized.

In addition, in an image display apparatus according to the present invention, it is preferable that the image group extracting section extracts the plural place image groups using an image feature obtained in advance by a machine learning method.

In recent years, the machine learning is widely used. In the machine learning, plural types of image feature quantities such as maximum value, minimum value, average value and intermediate value for each of sample images shot in various scenes are calculated, so that a computer learns relations between the scenes and the image features. When the machine learning is used, a number of feature quantities which cannot be handled by human can be used, and a correlation which substantially may not be conceived by human speculation is found. As a result, discrimination with high accuracy can be realized. When such machine learning is used, the series of image groups including an image presented at a place being set can be easily and accurately extracted.

Further, according to the present invention, a computer-readable storage medium storing an image display program which is executed in a computer and builds in the computer:

an image acquiring section which acquires plural cross-section image groups including plural cross-section images each in each of plural cut positions arranged in a predetermined direction in a subject;

a place setting section which sets a place on image for the cross-section images for each of the plural cross-section image groups acquired by the image acquiring section;

an image group extracting section which extracts place image groups in each of which the place image presented in the place continues over among the cross-section images, each of the place image groups for each of the plural cross-section image groups;

a cut position calculating section which calculates a cut position whose positional feature in each of the place image groups is common among the plural image groups, for each of plural the place image groups extracted by the image group extracting section; and an image display section which arranges to display cross-section images at the cut positions each calculated by the cut position calculating section in each of the plural cross-section image groups.

According to the computer-readable storage medium of the present invention, the image display apparatus, which displays the cross-section images on the same position in the pathological change areas from the plural cross-section images composing each of the cross-section image groups, can be built.

As to the image display program, only the basic mode is described, but this is only for avoiding redundant description. The image display program of the present invention may include not only the basic mode but also various modes corresponding to the modes of the image display apparatus.

Further, one element such as the image acquiring section, which is structured on a computer system by the image display program of the present invention, may be structured, by one program part, or plural elements may be structured by one program part. In addition, these elements may be structured in order to execute such functions by themselves, or may be structured in order to give instructions to another programs or program parts incorporated into the computer system so as to execute the functions.

According to the present invention, cross-section images related to one another can be accurately selected from plural cross-section images composing each of cross-section image groups for display.

DETAILED DESCRIPTION OF THE INVENTION

An embodiment of the present invention is described below with reference to the drawings.

Figure 1:
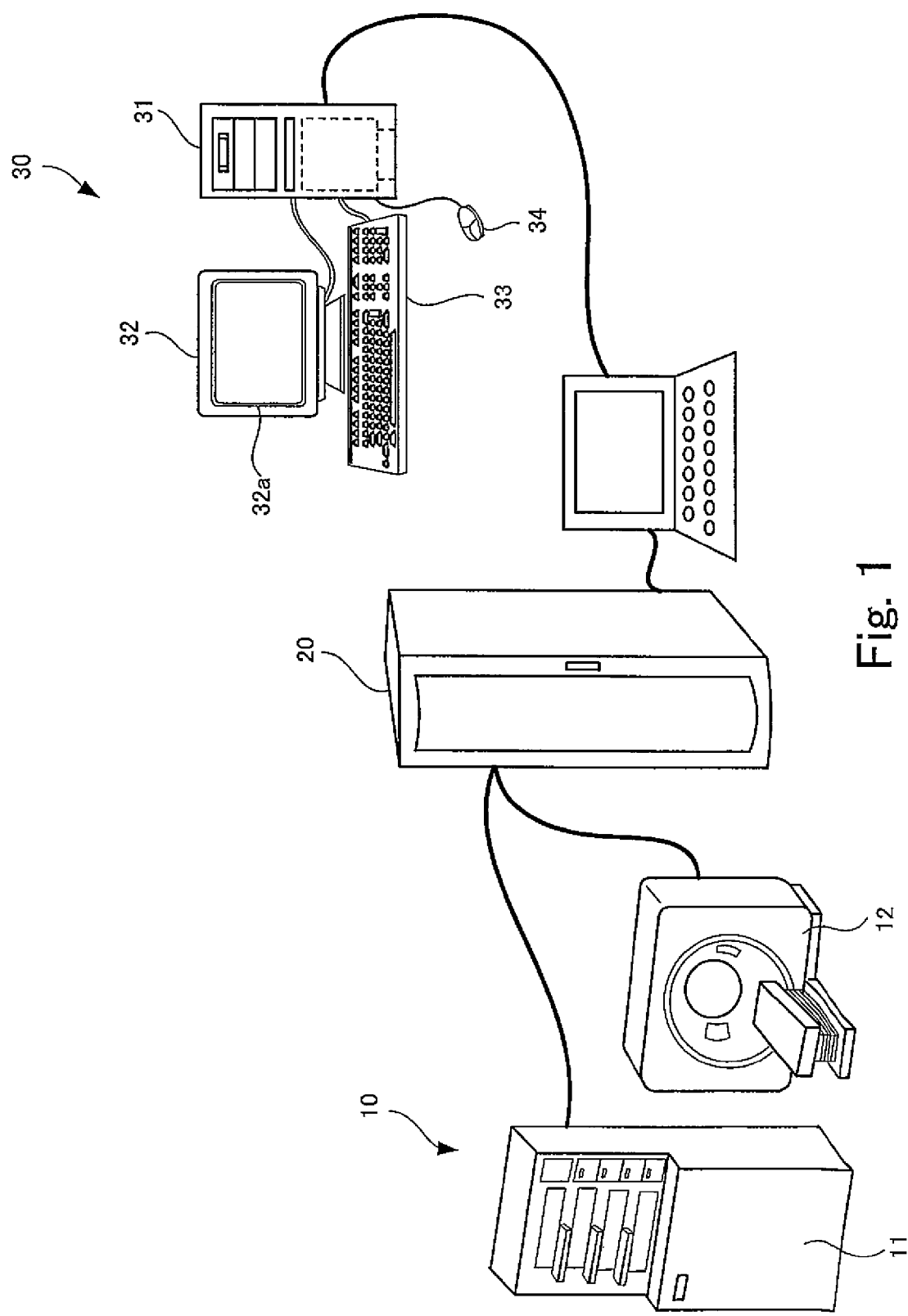
FIG. 1 is a schematic constitution diagram illustrating a medical diagnosis system according to one embodiment of the present invention.

FIG. 1 is a schematic constitution diagram illustrating a medical diagnosis system according to one embodiment of the present invention.

The medical diagnosis system shown in FIG. 1 includes an image generating apparatus 10 which photographs an inside of a subject so as to generate a medical image, a management server 20 which stores the medical images, medical charts and the like, and a diagnosis apparatus 30 which displays the medical images. The image generating apparatus 10 is connected to the management server 20 and the management server 20 is connected to the diagnosis apparatus 30 via network lines.

In this medical diagnosis system, identification numbers for identifying subjects are assigned to new subjects, and the identification numbers and medical charts are associated with each other and registered in the management server 20. The medical charts include names, ages, medical records and the like of the subjects.

The image generating apparatus 10 includes a CR apparatus 11, an MRI apparatus 12, a CT apparatus (not shown), an ultrasonic apparatus (not shown) and the like. The CR apparatus 11 irradiates a subject with a radial ray, and reads the radial ray transmitted through the subject so as to generate a digital medical image. The MRI apparatus 12 generates tomographic images of the subject using a high magnetic field and a radio wave. The CT apparatus generates tomographic images of a subject using radioactive rays. The ultrasonic apparatus reads an ultrasonic echo so as to generate a medical image. The medical image generated by the image generating apparatus 10 is transmitted to the management server 20 together with an identification number for identifying the subject of the medical image.

When the medical image and the identification number are sent from the image generating apparatus 10, the management server 20 associates the medical image with the identification number so as to store them. That is to say, identification numbers, medical charts of subjects to which the identification numbers are assigned, and medical images of the subjects are associated with each other so as to be registered in the management server 20.

The diagnosis apparatus 30 has a main body apparatus 31, an image display apparatus 32, a keyboard 33, and a mouse 34 as an external configuration. The image display apparatus 32 displays an image on a display screen 32a according to an instruction from the main body apparatus 31. The keyboard 33 is used for inputting various information into the main body apparatus 31 according to key operations. The mouse 34 specifies any position on the display screen 32a so as to input an instruction according to, for example, an icon displayed on that position.

When a user inputs a name and an identification number of a subject using the mouse 34 or the like of the diagnosis apparatus 30, the input contents are transmitted to the management server 20. The management server 20 transmits to the diagnosis apparatus 30 medical images and a medical chart which are associated with the name and the identification number of the subject transmitted from the diagnosis apparatus 30. In the diagnosis apparatus 30, the medical image transmitted from the management server 20 is displayed on the display screen 32a. By checking the medical images displayed on the display screen 32a of the diagnosis apparatus 30, the user can diagnose a disease condition of the subject without giving an external damage to the subject.

The user views the medical images displayed on the display screen 32a of the diagnosis apparatus 30 so as to diagnose the disease condition of the subject, and edits the medical chart using the mouse 34 and the keyboard 33. The edited medical chart is sent to the management server 20, and the medical chart stored in the management server 20 is updated with the new medical chart sent from the diagnosis apparatus 30.

The medical diagnosis system shown in FIG. 1 is basically constituted as above.

The characteristics of the medical diagnosis system according to an embodiment of the present invention lie in processing contents in the diagnosis apparatus 30. The diagnosis apparatus 30 is described in detail below.

Figure 2:
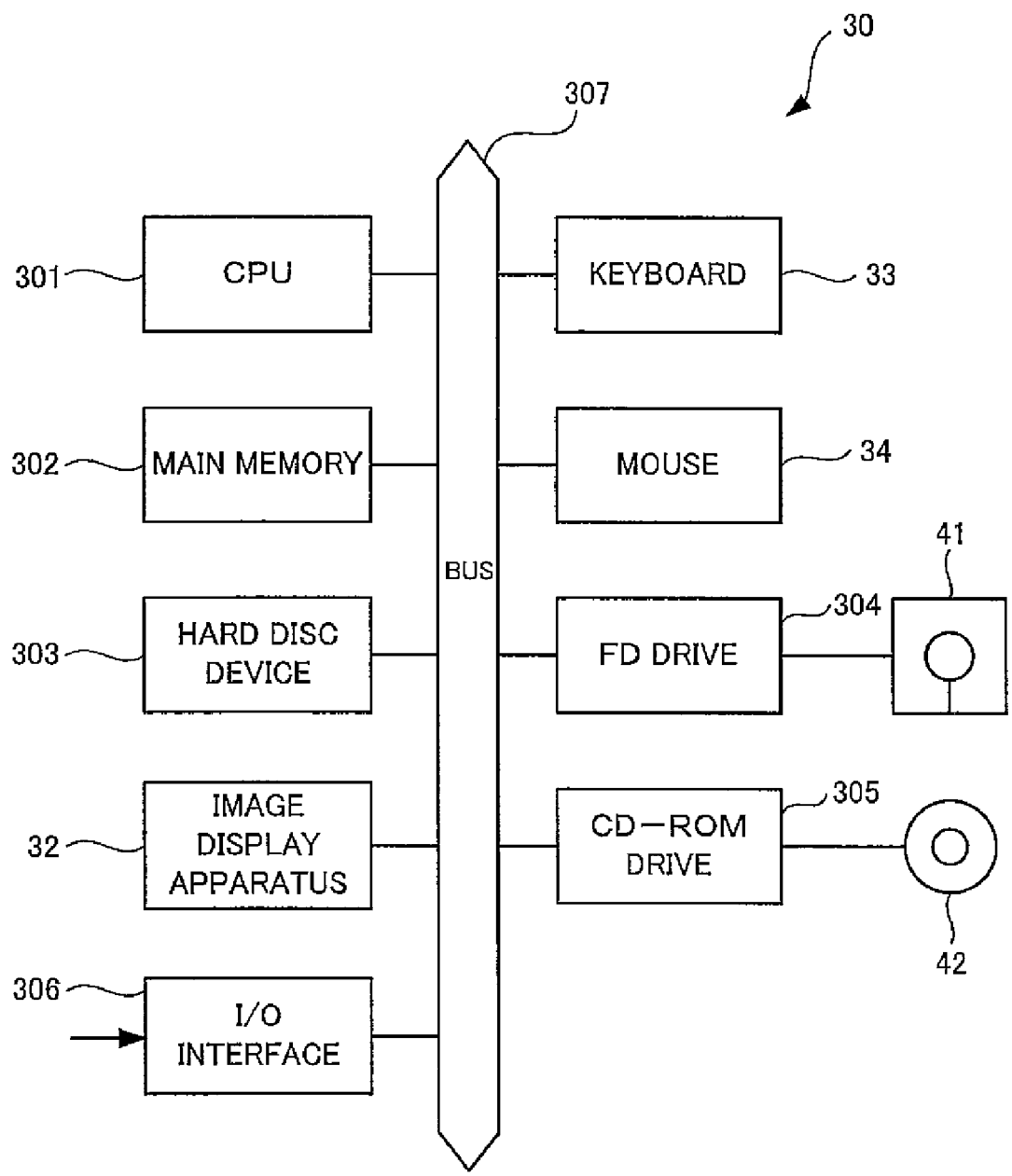
FIG. 2 is a hardware block diagram of a diagnosis apparatus.

FIG. 2 is a hardware block diagram of the diagnosis apparatus 30.

The main body apparatus 31 of the diagnosis apparatus 30 has therein a CPU 301, a main memory 302, a hard disc device 303, an FD drive 304, a CD-ROM drive 305, and an I/O interface 306 as shown in FIG. 2. The CPU 301 executes various programs. A program stored in the hard disc device 303 is read, and developed in the main memory 302 for an execution in the CPU 301. Various programs and data are stored in the hard disc device 303. The FD drive 304 is loaded with an FD 41 and accesses the FD 41. The CD-ROM drive 305 accesses a CD-ROM 42. The I/O interface 306 receives image data or the like from the management server 20 and transmits various instruction data to the management server 20. These various elements, and the image display apparatus 32, the keyboard 33 and the mouse 34 shown also in FIG. 1 are connected to each other via a bus 307.

A medical image display program 100 (see FIG. 3) is stored in the CD-ROM 42. The medical image display program 100 is an image display program according to one embodiment of the present invention for building the image display apparatus according to one embodiment of the present invention in the diagnosis apparatus 30.

Figure 3:
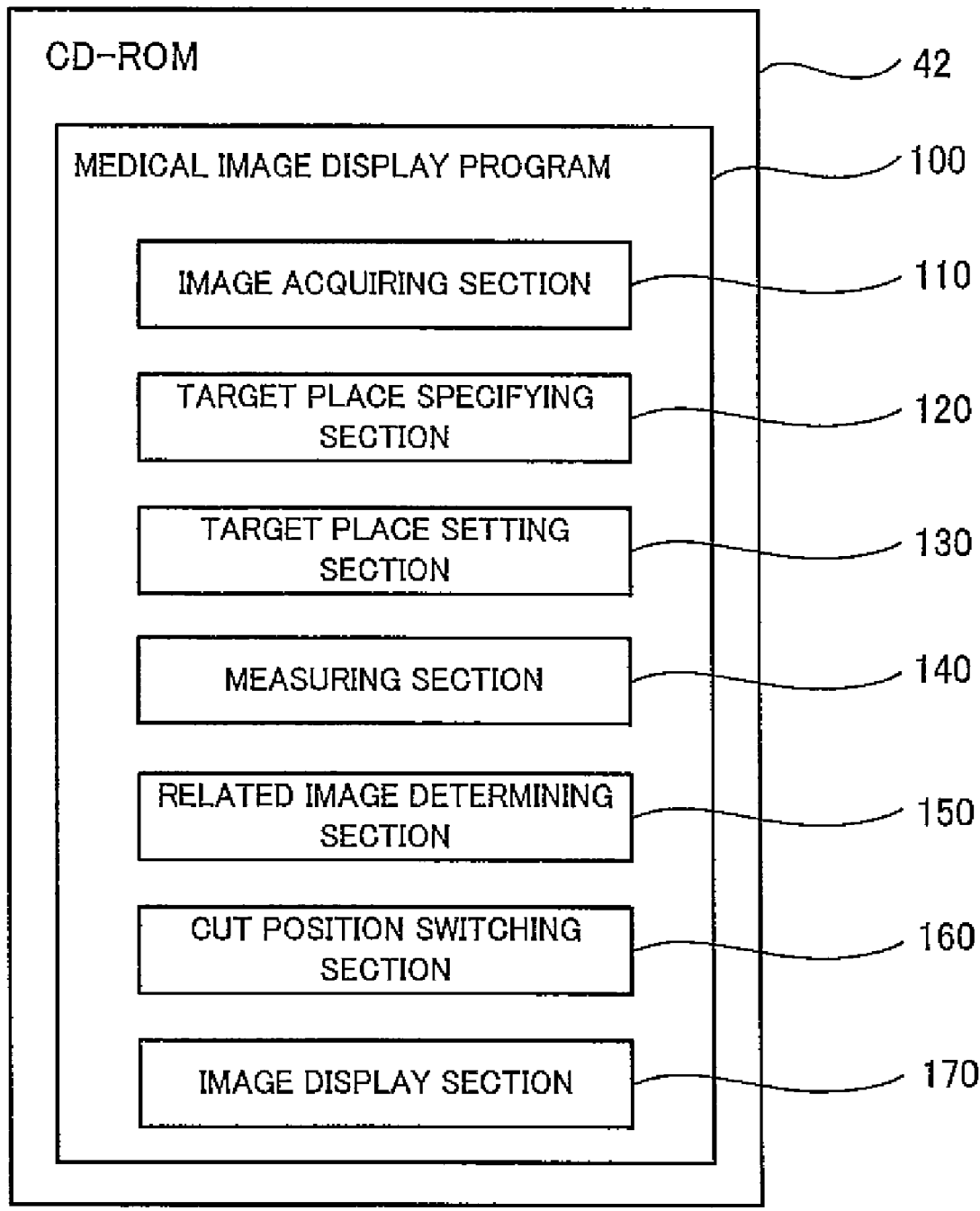
FIG. 3 is a conceptual diagram illustrating a CD-ROM.

FIG. 3 is a conceptual diagram illustrating the CD-ROM 42.

As shown in FIG. 3, the medical image display program 100 stored in the CD-ROM 42 includes an image acquiring section 110, a target place specifying section 120, a target place setting section 130, a measuring section 140, a related image determining section 150, a cut position switching section 160 and an image display section 170.

The CD-ROM 42 of the diagnosis apparatus 30 is loaded into the CD-ROM drive 305, and the medical image display program 100 stored in the CD-ROM 42 is uploaded in the diagnosis apparatus 30 and stored in the hard disc device 303. When the medical image display program 100 is started and executed, a medical image display apparatus 200 (see FIG. 4) as the image display apparatus according to an embodiment of the present invention is built in the diagnosis apparatus 30.

In the above description, the CD-ROM 42 is described as an example of a storage medium for storing the medical image display program 100. However, the storage medium for storing the medical image display program 100 is not limited to the CD-ROM, and other storage media such as an optical disc, MO, FD, magnetic tape or the like may be used. The medical image display program 100 may be provided directly to the diagnosis apparatus 30 via the I/O interface 306 without using the storage medium.

Details of respective sections in the medical image display program 100 will be described together with functions of the respective sections in the medical image display apparatus 200.

Figure 4:
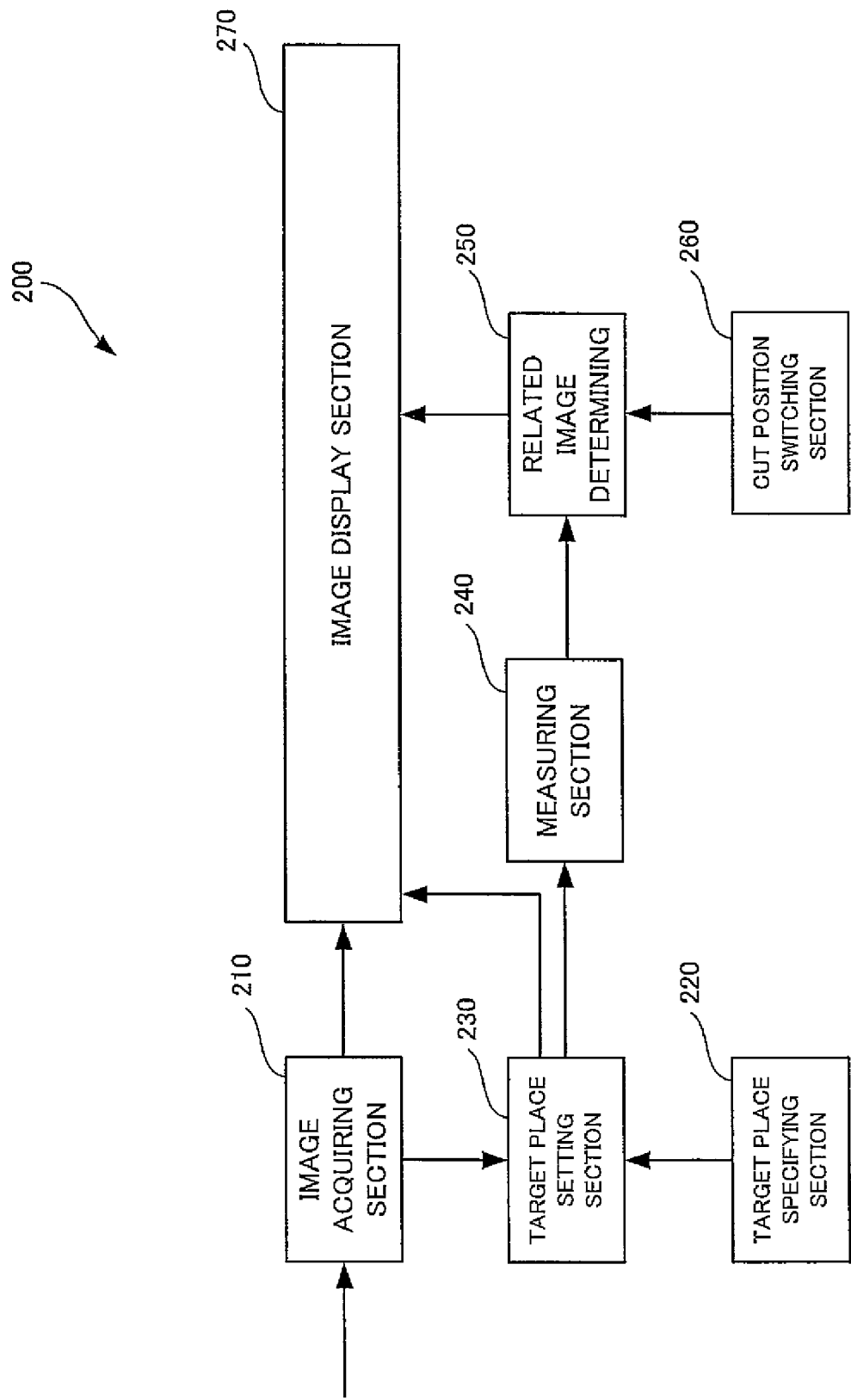
FIG. 4 is a function block diagram illustrating a medical image display apparatus.

FIG. 4 is a function block diagram illustrating the medical image display apparatus 200.

The medical image display apparatus 200 has an image acquiring section 210, a target place specifying section 220, a target place setting section 230, a measuring section 240, a related image determining section 250, a cut position switching section 260 and an image display section 270.

The image acquiring section 210, the target place specifying section 220, the target place setting section 230, the measuring section 240, the related image determining section 250, the cut position switching section 260 and the image display section 270 composing the medical image display apparatus 200 correspond to the image acquiring section 110, the target place specifying section 120, the target place setting section 130, the measuring section 140, the related image determining section 150, the cut position switching section 160 and the image display section 170 composing the medical image display program 100 shown in FIG. 3, respectively.

The respective elements in FIG. 4 are composed of a combination of hardware of a computer and an OS and application programs which are executed by the computer, while the respective elements of the medical image display program in FIG. 3 are composed of only application programs.

Figure 5:
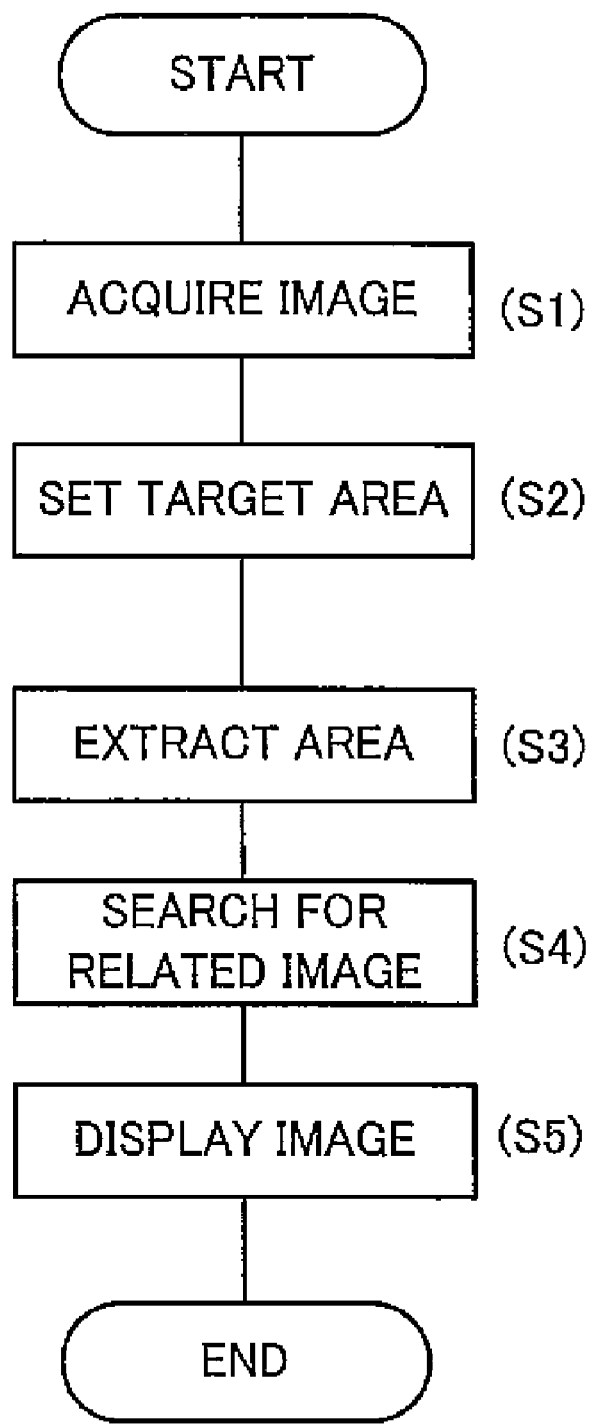
FIG. 5 is a flow chart illustrating a flow of a series of processes of from acquiring a medical image from a management server through displaying the acquired medical image.

FIG. 5 is a flow chart illustrating a flow of a series of processes from for acquiring medical images from the management server 20 through for displaying the acquired medical images on the medical image display apparatus 200 shown in FIG. 4.

The operations of the respective elements of the medical image display apparatus 200 shown in FIG. 4 will be described below with reference to the flow chart of FIG. 5. Accordingly, the respective elements of the medical image display programs 100 shown in FIG. 3 will also be described.

When a user uses the mouse 34 and the keyboard 33 shown in FIG. 1 to input a name and an identification number of a subject to be diagnosed, the input contents are sent to the management server 20 via the I/O interface 306 in FIG. 2. In the management server 20, medical images and medical charts which are related to the name and the identification number sent from the diagnosis apparatus 30 are sent to the diagnosis apparatus 30.

The medical images sent from the management server 20 are acquired by the image acquiring section 210 shown in FIG. 4 (step S1 in FIG. 5). The image acquiring section 210 corresponds to one example of the image acquiring section according to the present invention.

Figure 6:
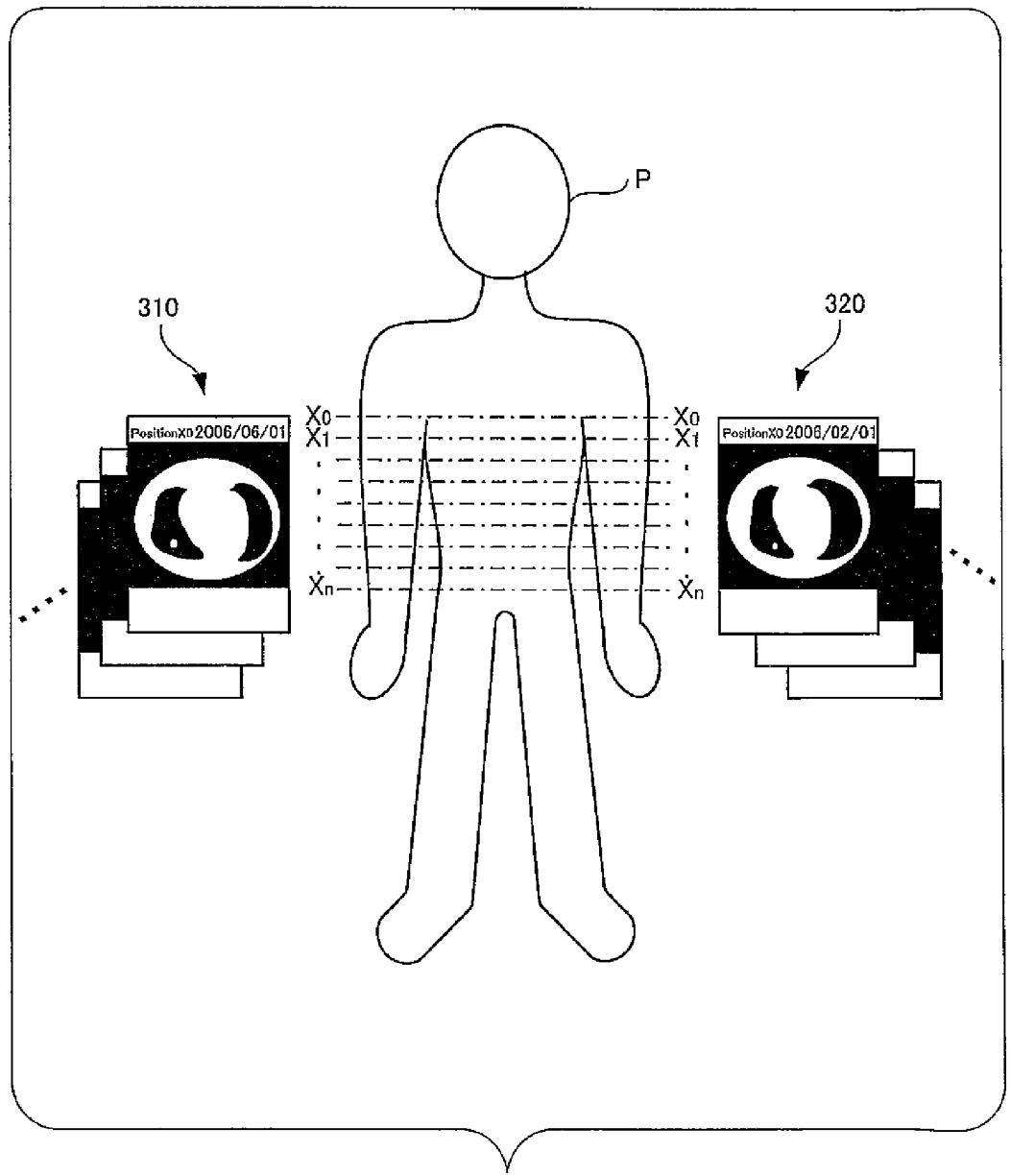
FIG. 6 is a diagram illustrating an image of the medical image transmitted from the management server.

FIG. 6 is a diagram illustrating an image of the medical images sent from the management server 20.

In the MRI apparatus 12 shown in FIG. 1, a subject P is laid on an inspection bench with a head being on a predetermined position, and respective cross sections in a photographing range including from chest to crotch of the subject P cut at predetermined intervals (slice width is 5 mm in this embodiment) are photographed. In this embodiment, the same subject P is photographed twice at different periods with the same slice width being set, and cross-section image groups 310 and 320 including plural cross-section images are generated by the twice photographing. The cross-section image groups 310 and 320 are stored in the management server 20. In this embodiment, since the cross-section image groups 310 and 320 are taken in a state where the same slice width is set, the cross-section images assigned with the same slice number are taken at the same cut position within the photographing range. Hereinafter, the cut position of the slice number i within the photographing range is represented by Xi, and the cross-section images on the cut positions Xi are represented by 310_Xi and 320_Xi in this description. The image acquiring section 210 acquires the cross-section image groups 310 and 320 of the twice photographing, and the acquired cross-section image groups 310 and 320 are sent to the image display section 270 and the target place setting section 230.

The image display section 270 displays a cross-section image display screen 410 (see FIG. 7) including the cross-section image groups 310 and 320 sent from the image acquiring section 210 on the display screen 32a shown in FIG. 1. The image display section 270 corresponds to one example of the image display section according to the present invention.

Figure 7:
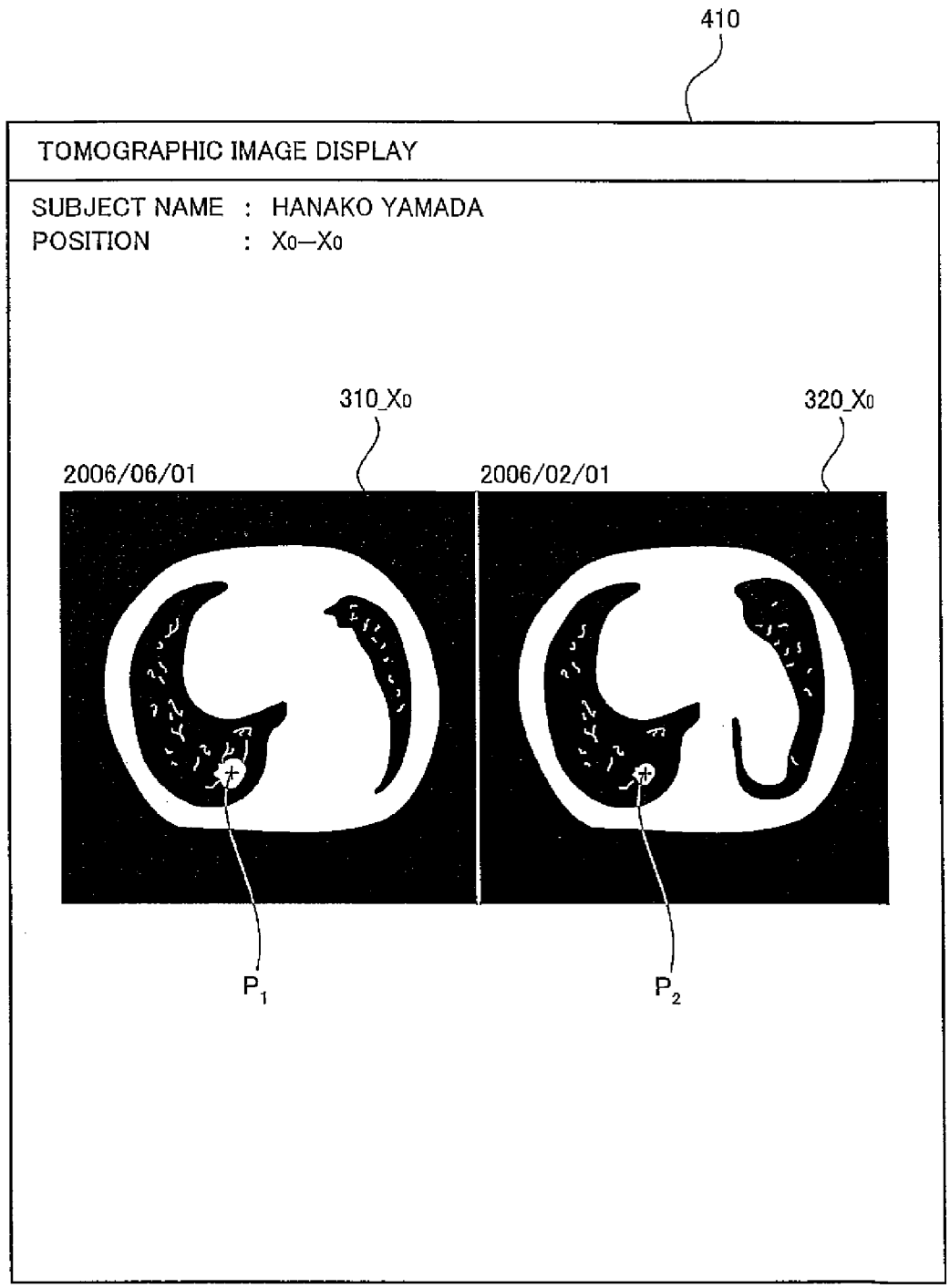
FIG. 7 is a diagram illustrating one example of a cross-section image display screen.

FIG. 7 is a diagram illustrating one example of the cross-section image display screen.

The cross-section images 310_X0 and 320_X0 at the cut position X0 corresponding to the end of the photographing range of the cross-section images composing the cross-section image groups 310 and 320 are displayed on the cross-section image display screen 410 shown in FIG. 7. Further, the cut positions, photographing dates, the subject's name and the like of the cross-section images 310_X0 and 320_X0 are displayed.

The two cross-section images 310_X0 and 320_X0 are acquired by photographing the cross-section of the same subject at the same cut position X0 within the photographing range at different periods. However, a position and an angle of a body axis of the subject slightly change due to twist of the subject's body, a change in a physical constitution, breathing or the like at the time of individual photographing. For this reason, even if a size or a shape of a nidus portion imaged on the two cross-section images 310_X0 and 320_X0 varies, it is difficult to confirm whether that variance is generated due to a change in the disease condition or displacement of the subject.

In the medical image display apparatus 200 according to this embodiment, the target place P1 is set on one cross-section image of the two cross-section images 310_X0 and 320_X0 (step S2 in FIG. 5). In the example of FIG. 7, when the user clicks a target point on the left cross-section image 310_X0 using the mouse 34 shown in FIG. 1, the position of the clicked target point is transmitted from the target place specifying section 220 to the target place setting section 230 shown in FIG. 4.

The target place setting section 230 determines the specified target point as the target place P1 as to one cross-section image of the cross-section images 310_X0 and 320_X0 where the target point is specified. On the other cross-section image where the target point is not specified, a place corresponding to the target place determined on the one cross-section image is determined as the target place P2. In the example of FIG. 7, when a pathological change portion on the left cross-section image 310_X0 is clicked, the pathological change portion is determined as the target place P1, and the place on the right cross-section image 320_X0 corresponding to the target place P1 is determined as the target place P2. The target place setting section 230 corresponds to one example of the place setting section according to the present invention. The positions of the determined target places P1 and P2, and the cross-section image groups 310 and 320 are transmitted to the measuring section 240.

In the measuring section 240, three-dimensional pathological change areas S1 and S2 respectively including the target places P1 and P2 on the cross-section images 310_X0 and 320_X0 are extracted (step S3 in FIG. 5), and long diameters and short diameters of the pathological change areas S1 and S2 are measured. The measuring section 240 corresponds to one example of the image group extracting section according to the present invention.

A method of extracting three-dimensional pathological change areas S1 and S2 respectively including the target places P1 and P2 and of measuring the long diameters and short diameters thereof will be briefly described.

In recent years, machine learning is widely used. In the machine learning, many kinds of image feature quantities, such as maximum value, minimum value, average value and intermediate value of pixel values are calculated for each of sample images taken in various scenes, and the relations between the scenes and the image feature are learned by a computer. When this machine learning is used, a great number of feature quantities which may not be treated by human can be used, and a correlation which substantially may not be conceived by human speculation is found. As a result, discrimination with high accuracy is realized. In this embodiment, the image features in typical pathological change areas which have been recognized as a tumor or the like in cross-section images are stored in the measuring section 240 in advance. The pathological change areas are searched for by using the machine learning.

The measuring section 240 determines three-dimensional target areas R1 and R2 respectively surrounding the target places P1 and P2 when cross-section images composing the cross-section image groups 310 and 320 are viewed in the slice direction (Y-axial direction). Sizes of the target areas R1 and R2 are prepared as experimental values securely including typical tumor, or the like.

Next, the image features of pixels included in the target areas R1 and R2 are analyzed, and the pixels in the target areas R1 and R2 are searched for pixels which match with the image features of the previously stored pathological change portion.

In addition, the pixels which match with the image features of the pathological change portions are evaluated as to whether the pixels are pixels composing outlines of the pathological change portions. Three-dimensional outlines of the pathological change areas S1 and S2 which include the target places P1 and P2 and are estimated to he the pathological change portions are extracted from the target areas R1 and R2.

When the outlines of the pathological change areas S1 and S2 are extracted, the long diameters and the short diameters of the pathological change areas S1 and S2 are measured.

The series of processes of extracting the outlines of the pathological change areas including the target places P1 and P2 upon designating the target places P1 and P2, and of further measuring the long diameters and the short diameters of the pathological areas is a technique which is devised as one-click measurement.

In the measuring section 240, the pathological change areas S1 and S2 which are extracted through the step of measuring the long diameters and the short diameters as well as the cross-section image groups 310 and 320 are transmitted to the related image determining section 250.

In the related image determining section 250, the positions of gravity centers on the extracted pathological change areas S1 and S2 are detected, and the cross-section images groups 310 and 320 are searched for cross-section images including the detected gravity center positions (step S4 in FIG. 5). The related image determining section 250 corresponds to one example of a cut position calculating section according to the present invention. The searched two cross-section images 310_Xn and 320_Xm are transmitted to the image display section 270.

The image display section 270 replaces the cross-section images 310_X0 and 320_X0 at the cut position X0 on the cross-section image display screen 410 shown in FIG. 7 with the cross-section images 310_Xn and 320_Xm transmitted from the related image determining section 250 and displays the replacing images (step S5 at FIG. 5).

Figure 8:
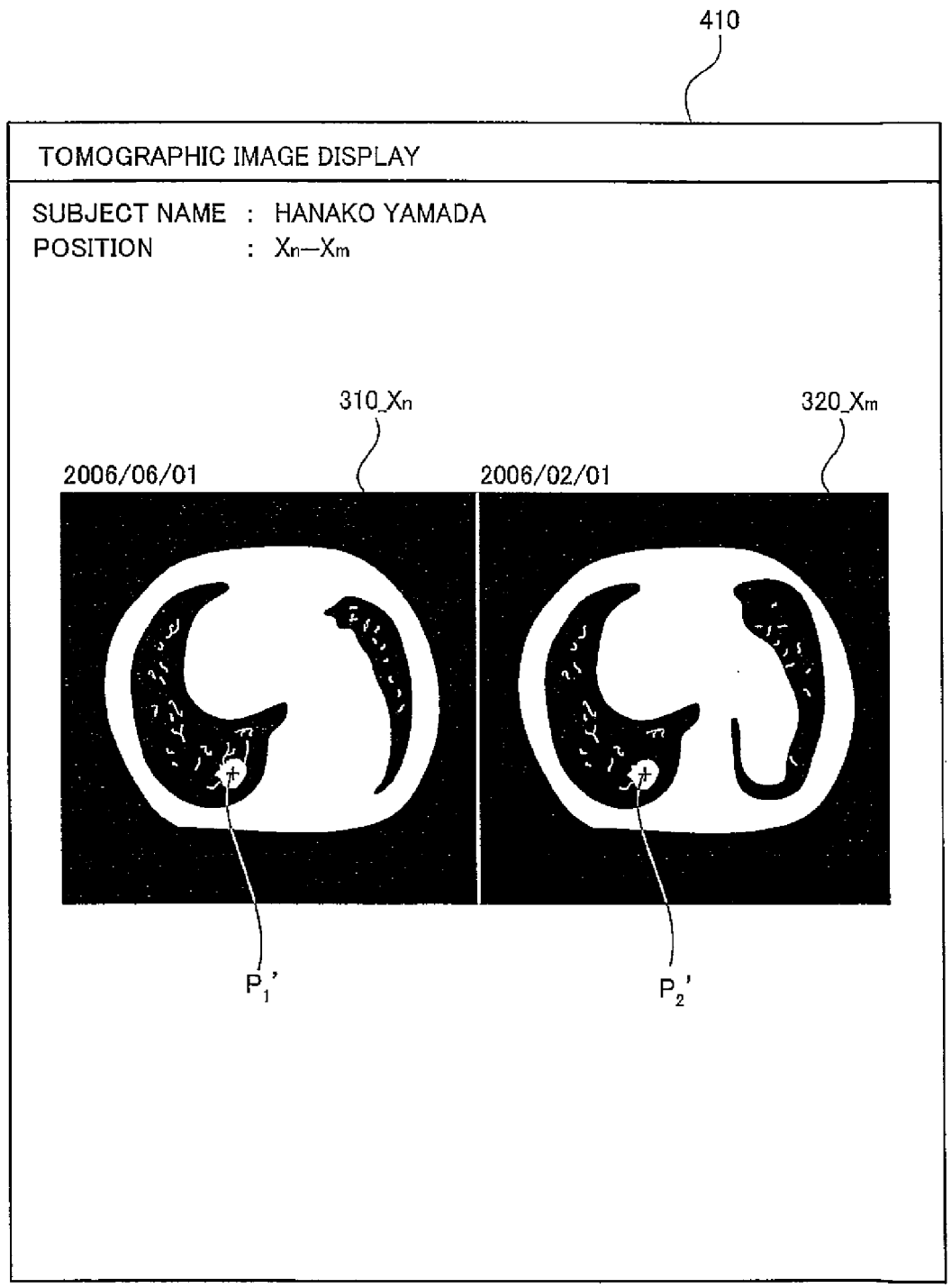
FIG. 8 is a diagram illustrating one example of the cross-section image display screen on which searched cross-section images are displayed.

FIG. 8 is a diagram illustrating one example of the cross-section image display screen 410 showing the searched cross-section images 310_Xn and 320_Xm.

The cross-section images 310_Xn and 320_Xm searched by the related image determining section 250 are arranged to be displayed on the cross-section image display screen 410 shown in FIG. 8. Mark images are displayed at gravity center positions P1' and P2' on the cross-section images 310 Xn and 320_Xm. The cut positions Xn and Xm within the photographing range on the cross-section images 310_Xn and 320_Xm are different from each other, but represent cross sections each at each of the gravity center positions of the pathological change areas S1 and S2 including the target places P1 and P2 (see FIG. 7) set by the user's specification. For this reason, the cross-section images 310_Xn and 320_Xm are compared with each other, so that the changes in the sizes and shapes of the pathological change areas S1 and S2 can be accurately recognized.

When the user rotates a wheel of the mouse 34 in the display states as shown in FIGS. 7 and 8, the cut position switching section 260 shown in FIG. 4 instructs the related image determining section 250 to switch the cut position.

In the related image determining section 250, cross-section images 310_Xn+k and 320_Xm+k at the cut positions Xn+k and Xm+k are transmitted to the image display section 270. The cut positions Xn+k and Xm+k are separated to a direction corresponding to the rotational direction of the wheel from the cut positions Xn and Xm of the currently displayed cross-section images 310_Xn and 320_Xm by a distance according to a rotation amount of the wheel. The cross-section images 310_Xn+k and 320_Xm+k are displayed on the cross-section image display screen 410 in the image display section 270. When the cut position is switched by the user's instruction for display, nidus can be checked on various cut positions, and the shape, size or the like of the nidus can be understood sterically.

As described above, according to this embodiment, even if nidus is shown on cross-section images at different cut position from the position in the other cross-section image group due to a shift of subject's posture or the like, cross-section images in which the cross sections of the pathological change areas in the same position are presented are automatically searched for and displayed. For this reason, changes in the nidus can be easily compared.

The first embodiment of the present invention has been described above, and a second embodiment of the present invention will be described below. The second embodiment of the present invention has the constitution similar to that in the first embodiment shown in FIG. 4. Therefore, FIG. 4 is diverted to the description in the second embodiment, and only differences from the first embodiment will be described.

In the medical image display apparatus 200 in the second embodiment, searching conditions in the related image determining section 250 in searching the cross-section images groups 310 and 320 for the cross-section images on which the cross sections of the pathological change areas S1 and S2 in the same position are shown are different from those in the first embodiment.

The related image determining section 250 of the second embodiment searches the cross-section image groups 310 and 320 for cross-section images where areas of image portions composing the pathological change areas S1 and S2 extracted by the measuring section 240 are the largest. The searched cross-section images 310_Xn and 320_Xm are transmitted to the image display section 270.

The cross-section images 310_Xn and 320_Xm transmitted to the image display section 270 are arranged to be displayed on the display screen 32a.

Accordingly, not cross-section images at the gravity center positions of the pathological change areas S1 and S2 but the cross-section images where the cross-section areas of the pathological change areas S1 and S2 are the largest are displayed, so that the user can securely recognize the changes in the sizes of the pathological change areas.

The second embodiment of the present invention has been described, and a third embodiment of the present invention will be described below. Since the third embodiment of the present invention also has the constitution similar to that in the first embodiment shown in FIG. 4, FIG. 4 is diverted to the description of the third embodiment, and only differences from the first embodiment will be described.

In the first and second embodiments, the cross-section images showing the cross sections of the corresponding positions on the pathological change areas S1 an S2 are searched and displayed. In these methods, however, when the slice widths are different from each other, cross-section images on the corresponding positions may not be present in some cases. In the medical image display apparatus 200 in the third embodiment, a pseudo cross-section image with a large slice width including the whole pathological change areas S1 and S2 are generated, so that cross-section images including the cross-sections at the corresponding positions in the pathological change areas are displayed regardless of the slice widths at the time of photographing.

Figure 9:
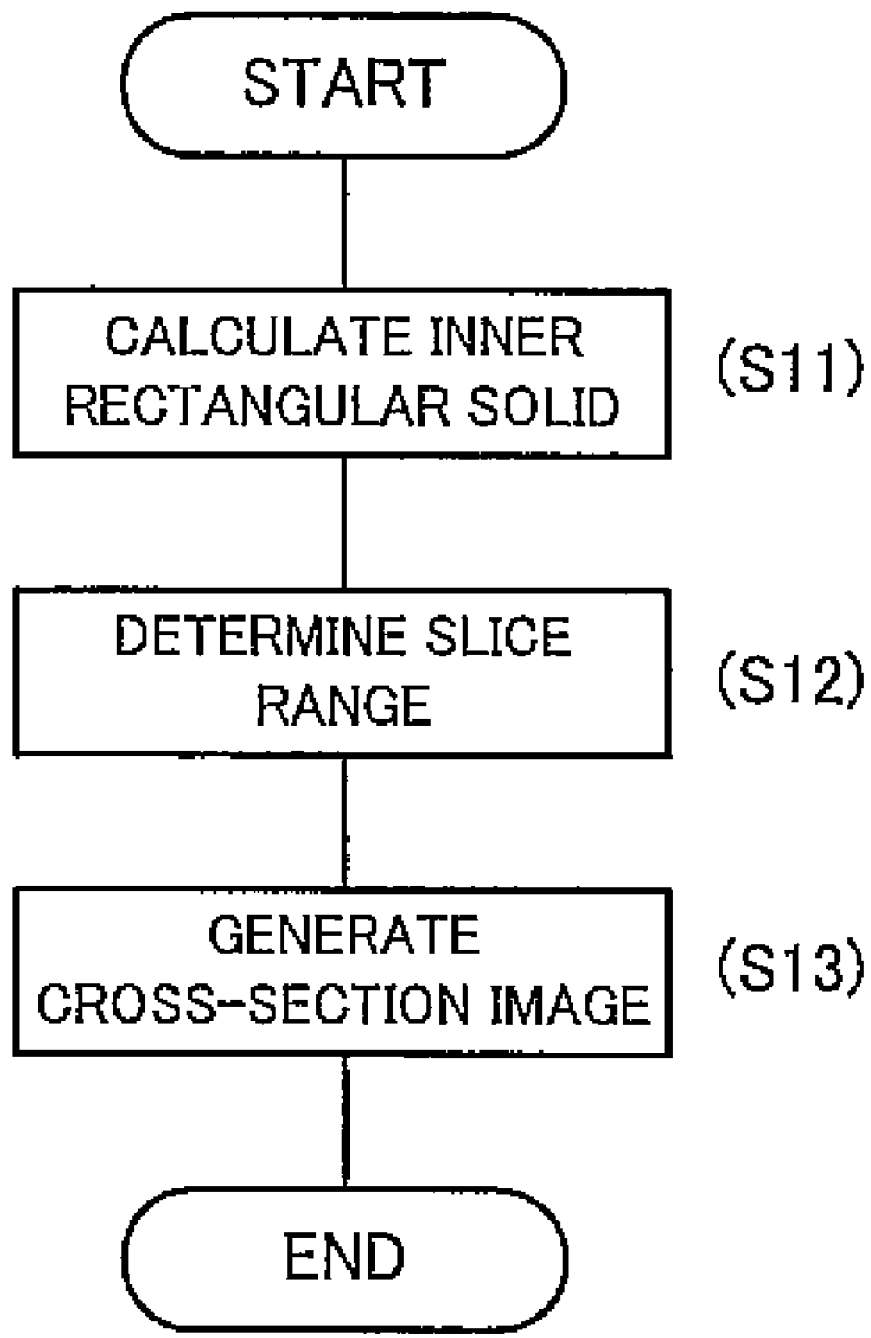
FIG. 9 is a flow chart illustrating a series of processes of generating a pseudo cross-section image including a nidus region.
Figure 10:
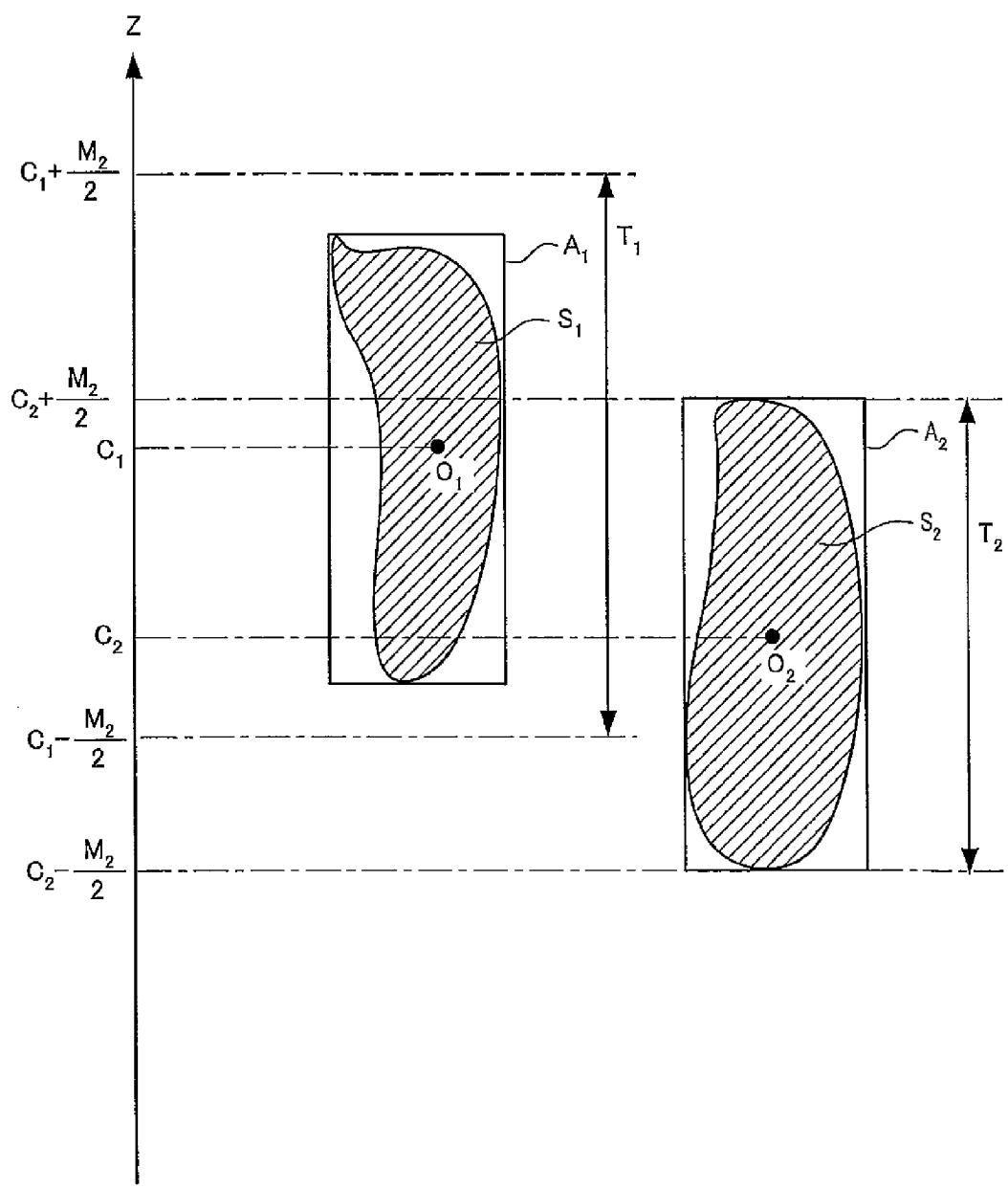
FIG. 10 is a conceptual diagram illustrating a method of generating the pseudo cross-section image.

FIG. 9 is a flow chart illustrating a series of processes of generating pseudo cross-section images including the pathological change areas S1 and S2 in the related image determining section 250 of the third embodiment. FIG. 10 is a conceptual diagram illustrating a method of generating pseudo cross-section images.

In the third embodiment, the cross-section image groups 310 and 320 are taken in a state where the different slice widths are set, and the cut positions within the photographing range are different from each other even in the cross-section images with the same slice number. The cut position with the slice number i in the cross-section image group 310 is represented by Xi, and the cut position with the slice number i in the cross-section image group 320 is represented by Yi.

The related image determining section 250 calculates minimum inclusion rectangular solids A1 and A2 containing the pathological change areas S1 and S2 extracted by the measuring section 240 for the respective cross-section image groups 310 and 320 (step S11 in FIG. 9).

Thereafter, new slice ranges and slice widths are determined (step S12 in FIG. 9). In the third embodiment, Z coordinates C1 and C2 of center points O1 and O2 each of the calculated minimum inclusion rectangular solids A1 and A2 are detected. At the same time, the longer of the lengths of the minimum inclusion rectangular solids A1 and A2 in the Z-axial direction is determined as the slice width. In the example shown in FIG. 10, the length of the minimum inner rectangular solid A1 on the pathological change area S1 in the Z-axial direction is represented by M1, and the length of the minimum inclusion rectangular solid A2 on the pathological change area S2 is represented by M2 (M2>M1). The longer length M2 of the minimum inner rectangular solid A2 in the Z-axial direction is determined as a new slice width.

In addition, a new slice range T1 of the cross-section image group 310 including the pathological change area S1 is determined as $(C1-M2/2) \leq z \leq (C1+M2/2)$ along the Z-axial direction. A new slice range T2 of the cross-section image group 320 including the pathological change area S2 is determined as $(C2-M2/2) \leq z \leq (C2+M2/2)$.

When the slice ranges and the slice widths are determined, the pseudo cross-section images with the new slice widths and the slice ranges are generated (step S13 in FIG. 9).

In the third embodiment, the ends of the new slice range T2 and both end points of the minimum inclusion rectangular solid A2 are on the same position on the pathological change area S2 whose length in the Z-axial direction is longer. However, the new slice range is longer than the length of the minimum inclusion rectangular solid A1 in the pathological change area S1 whose length in the Z-axial direction is shorter, and thus an area which is not included in the minimum inclusion rectangular solid A1 is generated within the new slice range T1.

First, on the pathological change area S2 with the longer length in the Z-axial direction, the slice number i of the cross-section image 320_Yi included within the new slice range T2 is set as $n1 \leq i \leq n2$, and values of the pixels in the cross-section image 320_Xi are determined as $Si(x,y)$. In this case, an average value of the pixel values $Si(x,y)$ within $n1 \leq i \leq n2$ is calculated as pixel values $S'(x,y)$ of the pseudo cross section image 320S'.

In addition, on the pathological change area S1 with the shorter length in the Z-axial direction, an area included in the minimum inclusion rectangular solid A1 within the new slice range T1 is weighted, so that a new cross-section image 310S' is generated.

Figure 11:
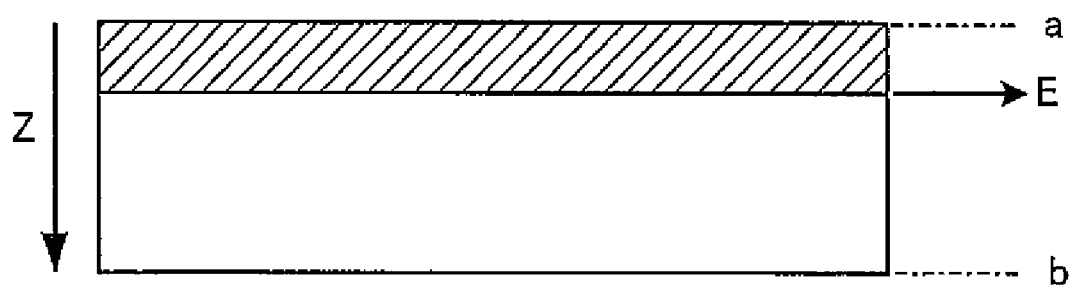
FIG. 11 is a conceptual diagram illustrating the method of generating a cross-section image where weighting is taken into consideration.

FIG. 11 is a conceptual diagram illustrating a method for generating cross-section images where weighting is taken into consideration.

When an end position E of the minimum inclusion rectangular solid is present between positions a and b of both ends of the new slice range, the cross-section image 310_E at the end position E is weighted by $|E-a|/|a-b|$. An average value of the pixel values $Si(x,y)$ is calculated, and the pixel values $S'(x,y)$ of the pseudo cross-section image 310S' are determined. The related image determining section 250 corresponds also to one example of a cross-section image generating section of the present invention.

The new cross-section images 310' and 320S' thus generated are transmitted to the image display section 270 so as to be displayed on the display screen.

When cross-section images with large slice width containing the whole pathological changes area each included in each of the cross-section images are generated, the size or the like of the pathological change area can be easily confirmed regardless of the slice width of the original cross-section image.

The example that the cross-section images included in two sets of the cross-section image groups are displayed is described above, but the image display section of the present invention may display cross-section images included in three or more sets of cross-section image groups.

The example that the cross-section images with large slice width including the whole pathological change areas are generated is described above. However, new slice ranges each including each of plural pathological change areas may be set, so that cross-section images obtained by cutting pathological change areas at each of plural positions within the slice ranges may be generated.

The example that the target points are specified is described above on the cross-section images. However, the place setting section of the present invention may specify target areas on the cross-section images.

The example that a target place which is estimated as nidus on a cross-section image is manually specified is described above. However, the place setting section of the present invention may search a cross-section image for an image portion having an image pattern similar to a sample image according to image processing, and may set the searched image portion as the target place.

The image display apparatus of the present invention may store a position of a pathological change portion on a cross-section image imaged in the past. When obtaining a new cross-section image group, the image display apparatus may display a list of past pathological change portions, and acquire a position of the pathological change portion selected by a user so as to set this position as a target place for current operation.

When a target place on a right lung field or a left lung field, for example, is specified, the image display apparatus of the present invention may set a center point of the right lung field or the left lung field as the target place.

The example that the image display apparatus of the present invention is applied to the diagnosis apparatus is described above. However, the image display apparatus of the present invention may be applied to a management server or the like.

What is claimed is:

1. An image display apparatus comprising:
    an image acquiring section which acquires a plurality of cross-section image groups including a plurality of cross-section images each in each of a plurality of cut positions arranged in a predetermined direction in a subject;
    a place setting section which sets a place on image for the cross-section images for each of the plurality of cross-section image groups acquired by the image acquiring section;
    an image group extracting section which extracts place image groups in each of which the place image presented in the place continues over a plurality of the cross-section images, each of the place image groups for each of the plurality of cross-section image groups;
    a cut position calculating section which calculates a cut position whose positional feature in each of the place image groups is common among the plurality of image groups, for each of a plurality of the place image groups extracted by the image group extracting section; and
    an image display section which arranges to display cross-section images at the cut positions each calculated by the cut position calculating section in each of the plurality of cross-section image groups.

2. The image display apparatus according to claim 1, wherein
    the cut position calculating section calculates cut positions having the feature among the cut positions of the plurality of cross-section images, and
    the image display section displays the cross-section images at the cut positions calculated by the cut position calculating section among the plurality of cross-section images.

3. The image display apparatus according to claim 1, wherein
    the cut position calculating section calculates new cut positions each different from the cut positions each of the plurality of cross-section images as the cut positions having the feature,
    the image display apparatus further comprises a cross-section image generating section which generates new cross-section images at the cut positions calculated by the cut position calculating section based on the plurality of cross-section images included in the cross-section image groups, and
    the image display section displays the cross-section images generated by the cross-section image generating section.

4. The image display apparatus according to claim 1, wherein the cut position calculating section calculates a cut position which passes through the center of gravity in each of the plurality of place image groups.

5. The image display apparatus according to claim 1, wherein the cut position calculating section calculates a cut position of the place image having a maximum area in the place image groups.

6. The image display apparatus according to claim 1, wherein the plurality of cross-section image groups are shot for a same subject at different periods.

7. The image display apparatus according to claim 1, wherein the image group extracting section extracts the plurality of place image groups using an image feature obtained in advance by a machine learning method.

8. A computer-readable storage medium storing an image display program which is executed in a computer and builds in the computer:
    an image acquiring section which acquires a plurality of cross-section image groups including a plurality of cross-section images each in each of a plurality of cut positions arranged in a predetermined direction in a subject;
    a place setting section which sets a place on image for the cross-section images for each of the plurality of cross-section image groups acquired by the image acquiring section;
    an image group extracting section which extracts place image groups in each of which the place image presented in the place continues over a plurality of the cross-section images, each of the place image groups for each of the plurality of cross-section image groups;
    a cut position calculating section which calculates a cut position whose positional feature in each of the place image groups is common among the plurality of image groups, for each of a plurality of the place image groups extracted by the image group extracting section; and
    an image display section which arranges to display cross-section images at the cut positions each calculated by the cut position calculating section in each of the plurality of cross-section image groups.

* * * * *